(12) United States Patent
Cho et al.

(10) Patent No.: US 11,334,039 B2
(45) Date of Patent: May 17, 2022

(54) METHOD AND APPARATUS FOR CONTROLLING A GUIDING DEVICE BASED ON USER'S FUTURE ACTIVITY AND COMPUTER READABLE MEDIUM STORING THE METHOD

(71) Applicant: SAMSUNG ELECTRONICS CO., LTD., Suwon-si (KR)

(72) Inventors: Hyung-Rae Cho, Seoul (KR); Hyun-Joo Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 208 days.

(21) Appl. No.: 16/376,400

(22) Filed: Apr. 5, 2019

(65) Prior Publication Data

US 2019/0286082 A1 Sep. 19, 2019

Related U.S. Application Data

(63) Continuation of application No. 13/238,927, filed on Sep. 21, 2011, now abandoned.

(30) Foreign Application Priority Data

Sep. 28, 2010 (KR) .................. 10-2010-0093802

(51) Int. Cl.
  *G05B 15/02* (2006.01)
  *H04L 12/28* (2006.01)
(52) U.S. Cl.
  CPC .......... *G05B 15/02* (2013.01); *H04L 12/2803* (2013.01); *H04L 12/2818* (2013.01); *H04L 12/2823* (2013.01); *H04L 12/2825* (2013.01)

(58) Field of Classification Search
  CPC .. G05B 15/02; H04L 12/2803; H04L 12/2818; H04L 12/2823; H04L 12/2825; H04L 12/12; G06F 16/00
  See application file for complete search history.

(56) References Cited

U.S. PATENT DOCUMENTS

| 6,563,430 | B1 | 5/2003 | Kemink |
| 7,293,236 | B2 | 11/2007 | Choi et al. |
| 7,774,439 | B2 | 8/2010 | Baek et al. |
| 8,396,422 | B2 | 3/2013 | Takasaki et al. |
| 2002/0062365 | A1 | 5/2002 | Nishikawa et al. |
| 2002/0069276 | A1 | 6/2002 | Hino et al. |
| 2002/0073183 | A1 | 6/2002 | Yoon et al. |

(Continued)

FOREIGN PATENT DOCUMENTS

| CN | 101718988 | 6/2010 |
| CN | 101776907 | 7/2010 |

(Continued)

OTHER PUBLICATIONS

European Search Report dated Dec. 19, 2017, issued in counterpart application No. 11829508.8-1927, 6 pages.

(Continued)

*Primary Examiner* — Tejal Gami
(74) *Attorney, Agent, or Firm* — Sughrue Mion, PLLC

(57) ABSTRACT

A device control method and apparatus and computer readable medium storing the method, the method including selecting at least one device based on at least one outdoor environment information; and generating control information regarding the selected at least one device based on the at least one outdoor environment information.

30 Claims, 11 Drawing Sheets

(56) References Cited

U.S. PATENT DOCUMENTS

| | | |
|---|---|---|
| 2003/0018776 A1 | 1/2003 | Yoon et al. |
| 2003/0071117 A1 | 4/2003 | Meade, II |
| 2004/0054783 A1 | 3/2004 | Takemura |
| 2004/0202206 A1 | 10/2004 | Lee |
| 2005/0096753 A1 | 5/2005 | Arling et al. |
| 2005/0198063 A1 | 9/2005 | Thomas et al. |
| 2006/0059003 A1 | 3/2006 | Requena |
| 2006/0080408 A1 | 4/2006 | Istvan et al. |
| 2006/0105760 A1 | 5/2006 | Shamoon et al. |
| 2006/0111816 A1 | 5/2006 | Spalink et al. |
| 2006/0142968 A1 | 6/2006 | Han et al. |
| 2006/0283965 A1 | 12/2006 | Mueller et al. |
| 2007/0112939 A1 | 5/2007 | Wilson |
| 2007/0114295 A1 | 5/2007 | Jenkins |
| 2007/0115108 A1 | 5/2007 | Martin et al. |
| 2007/0156256 A1 | 7/2007 | Jung |
| 2008/0147205 A1 | 6/2008 | Ollis |
| 2008/0160938 A1 | 7/2008 | Hwang et al. |
| 2008/0281472 A1 | 11/2008 | Podgorny et al. |
| 2008/0320126 A1 | 12/2008 | Drucker |
| 2009/0083167 A1 | 3/2009 | Subbloie |
| 2009/0195349 A1 | 8/2009 | Frader-Thompson et al. |
| 2009/0233602 A1 | 9/2009 | Hughes |
| 2009/0287828 A1 | 11/2009 | Wei et al. |
| 2010/0231140 A1 | 9/2010 | Aarts |
| 2010/0286841 A1 | 11/2010 | Subbloie |
| 2010/0289643 A1 | 11/2010 | Trundle et al. |
| 2011/0015797 A1 | 1/2011 | Gilstrap |
| 2012/0143662 A1 | 6/2012 | Heath |
| 2012/0303137 A1 | 11/2012 | Schoeller |

FOREIGN PATENT DOCUMENTS

| | | |
|---|---|---|
| CN | 101835300 | 9/2010 |
| JP | 2005-051376 | 2/2005 |
| JP | 2006-235886 | 9/2006 |
| JP | 2007-124540 | 5/2007 |
| JP | 2008-312105 | 12/2008 |
| JP | 2010-206646 | 9/2010 |
| KR | 1020020079203 | 10/2002 |
| KR | 100438696 | 7/2004 |
| KR | 1020040080663 | 9/2004 |
| KR | 100694295 | 3/2007 |
| KR | 1020090038227 | 4/2009 |
| KR | 100899183 | 5/2009 |
| KR | 1020100027881 | 3/2010 |
| KR | 100960832 | 6/2010 |

OTHER PUBLICATIONS

Korean Office action dated Feb. 20, 2017, issued in counterpart application No. 10-2010-0093802, 8 pages.
Korean Office Action dated Oct. 5, 2016, issued in counterpart application No. 10-2010-0093802, 14 pages.
Japanese Office Action dated Mar. 28, 2016, issued in counterpart application No. 2013-531478, 4 pages.
Chinese Office Action dated Jan. 7, 2016, issued in counterpart application No. 201180046965.9, 18 pages.
Chinese Office Action dated Jun. 30, 2015, issued in counterpart application No. 201180046965.9, 24 pages.
Japanese Office Action dated Jul. 17, 2015, issued in counterpart application No. 2013-531478, 6 pages.
Communication dated Oct. 21, 2020, issued by the European Patent Office in counterpart European Application No. 11829508.8.

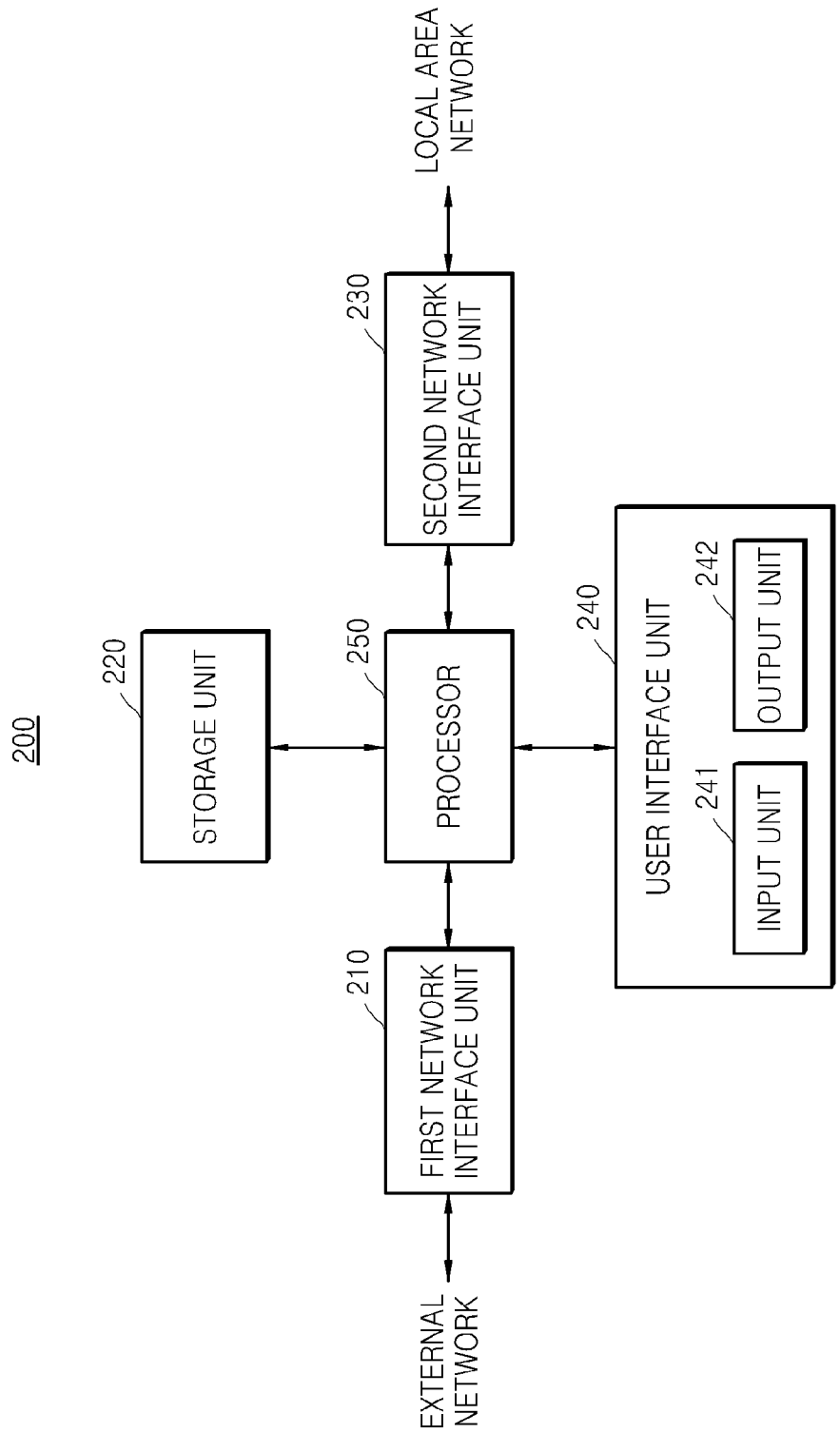

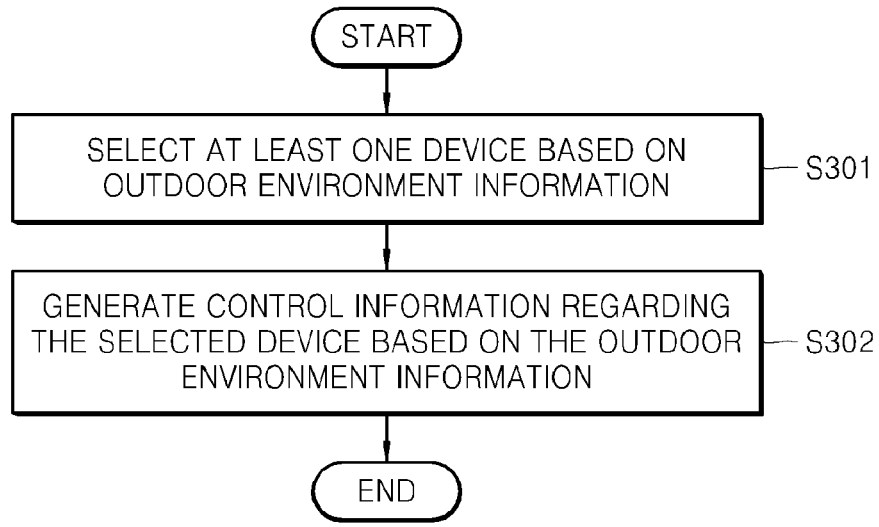
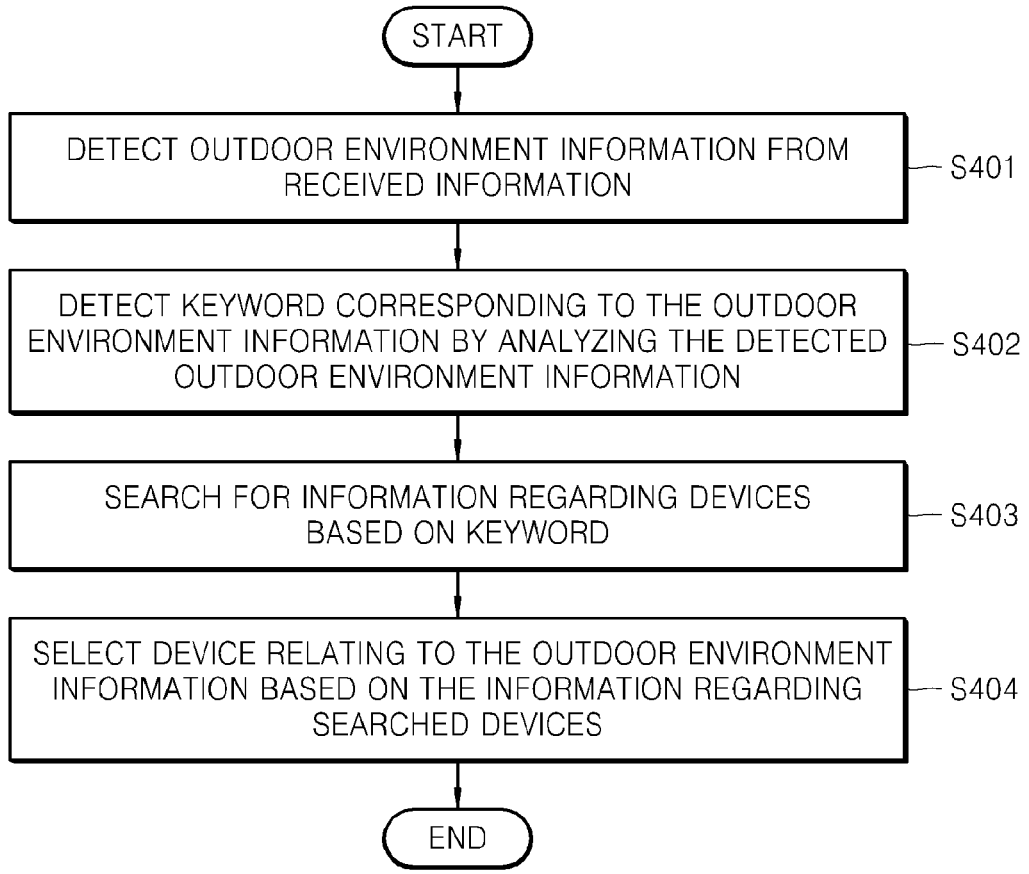

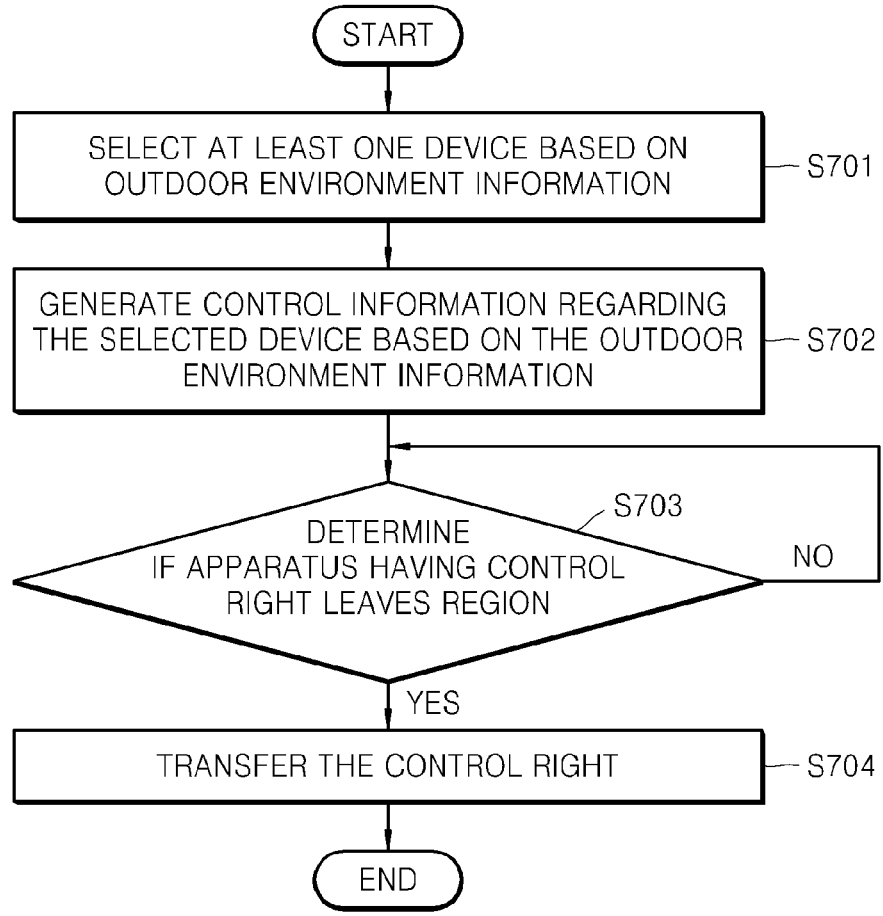
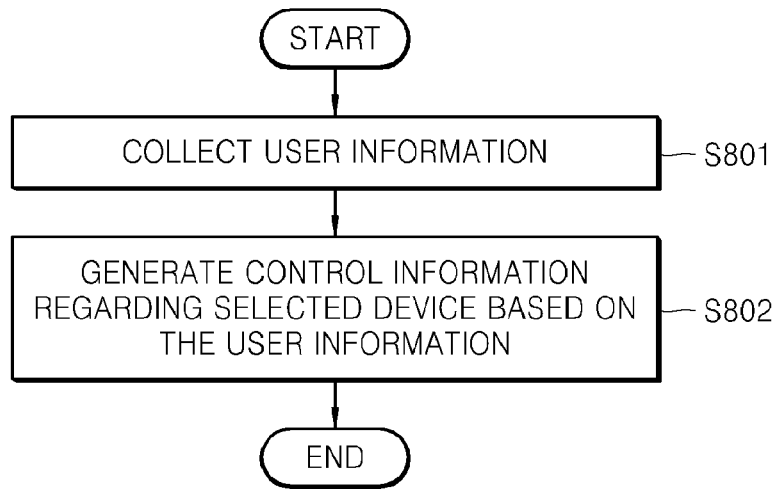

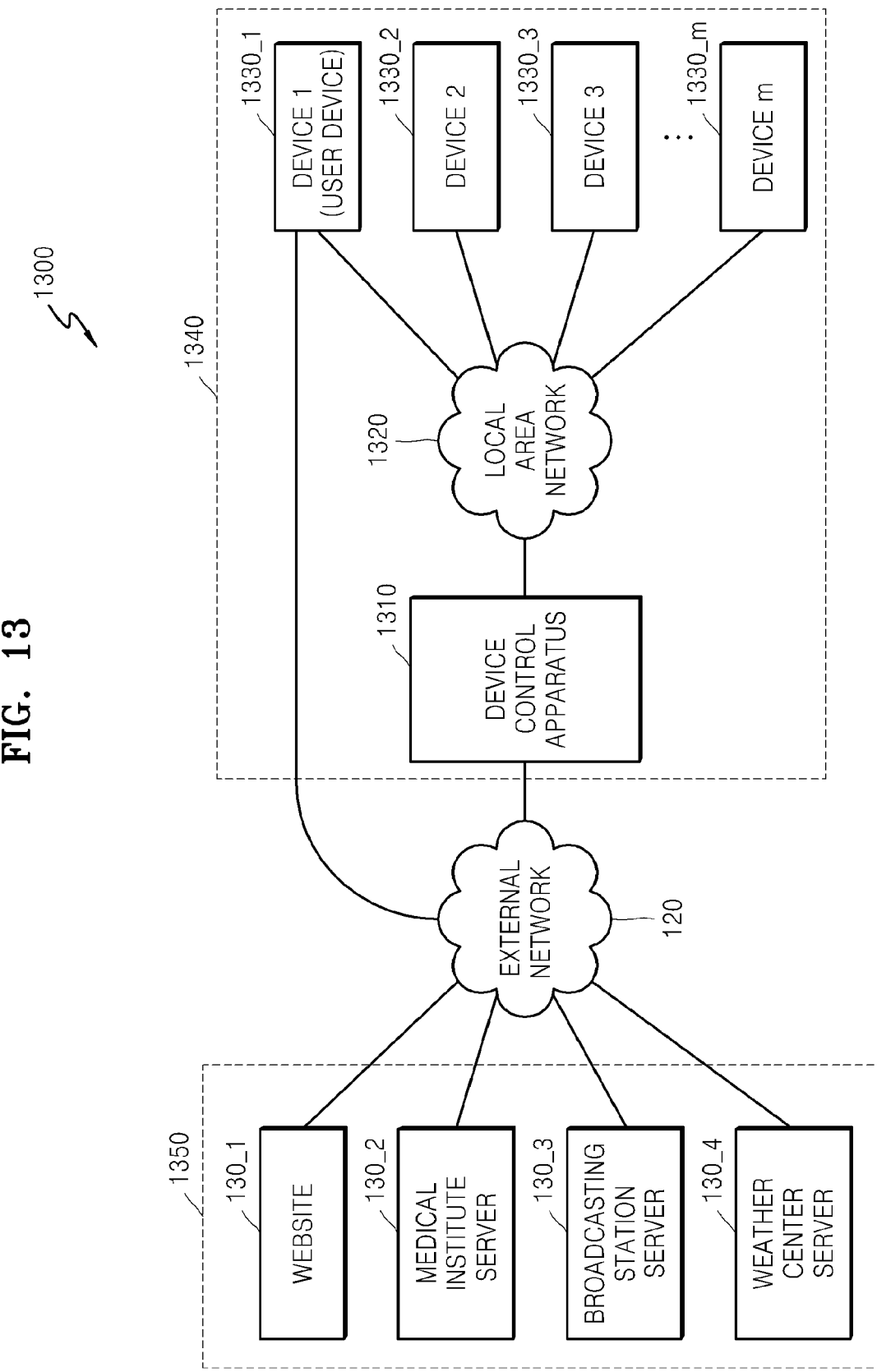

METHOD AND APPARATUS FOR CONTROLLING A GUIDING DEVICE BASED ON USER'S FUTURE ACTIVITY AND COMPUTER READABLE MEDIUM STORING THE METHOD

PRIORITY

This application is a continuation application of U.S. patent application Ser. No. 13/238,927 filed on Mar. 29, 2012, which claims priority under 35 U.S.C. § 119(a) to Korean Patent Application No. 10-2010-0093802, filed on Sep. 28, 2010 in the Korean Intellectual Property Office, the disclosures of which are incorporated herein by their entirety by reference.

BACKGROUND OF THE INVENTION

1. Field of the Invention

The present invention relates generally to a method and apparatus for controlling a network-based device and computer readable medium storing the method.

2. Description of the Related Art

An example of a network-based device control apparatus may be a home automation system. A conventional home automation system generally controls indoor devices based on the indoor environment. That is, the conventional home automation system measures the indoor environment such as the temperature, humidity, air contamination, and the like by using a sensor and a previously set condition, and controls functions of devices such as air conditioners, humidifiers, boilers, robot cleaners, air cleaners, etc., according to the result of such measurement.

However, based on recent developments in network technology and high level of functionality of various devices, a network-based device control technology capable of providing various services is needed.

SUMMARY OF THE INVENTION

The present invention provides a method and apparatus for controlling a network-based device by using outdoor environment information and computer readable medium storing the method.

The present invention also provides a method and apparatus for controlling a network-based device by using outdoor environment information and indoor environment information and computer readable medium storing the method.

The present invention also provides a method and apparatus for controlling a network-based device by using outdoor environment information, indoor environment information, and user information and computer readable medium storing the method.

The present invention also provides a method and apparatus for controlling a network-based device by using outdoor environment information and user information and computer readable medium storing the method.

The present invention also provides a method and apparatus for controlling a network-based device by using user information and computer readable medium storing the method.

According to an aspect of the present invention, a device control method is provided, including selecting at least one device-based on at least one outdoor environment information; and generating control information regarding the selected at least one device-based on the at least one outdoor environment information.

According to another aspect of the present invention, a device control method is provided, including selecting at least one device-based on at least one user information; and generating control information regarding the selected at least one device-based on the at least one user information.

According to another aspect of the present invention, a device control apparatus is provided, including a first network interface unit for interfacing with an external network; a second network interface unit for interfacing with a local area network; and a processor for selecting at least one device accessible through the second network interface unit based on at least one outdoor environment information received through the first network interface unit, and generating control information regarding the selected at least one device-based on the at least one outdoor environment information. According to another aspect of the present invention, a device control apparatus is provided, including a first network interface unit for interfacing with an external network; a second network interface unit for interfacing with a local area network; a processor for selecting at least one device-based on user information obtained by searching for at least one of an external database and an internal database accessible through the second network interface unit and the second network interface unit and generating control information regarding the selected at least one device-based on the user information; and a storage unit for storing database based on the user information, wherein the database stored in the storage unit corresponds to the internal database.

According to another aspect of the present invention, a non-transitory computer-readable recording medium having embodied thereon a program for executing the device control method is provided, including selecting at least one device-based on at least one outdoor environment information; and generating control information regarding the selected at least one device-based on the at least one outdoor environment information.

According to another aspect of the present invention, a non-transitory computer-readable recording medium having embodied thereon a program for executing the device control method is provided, including selecting at least one device-based on at least one user information; and generating control information regarding the selected at least one device-based on the at least one user information.

BRIEF DESCRIPTION OF THE DRAWINGS

The above and other features, aspects and advantages of the present invention will become more apparent by describing in detail embodiments thereof with reference to the attached drawings in which:

FIG. 2 is a block diagram illustrating a device control apparatus, according to an embodiment of the present invention;

FIG. 3 is a flowchart illustrating a device control method performed by the device control apparatus of FIG. 2, according to an embodiment of the present invention;

FIG. 4 is a flowchart illustrating a method of selecting at least one device-based on outdoor environment information of FIG. 3;

FIG. 7 is a flowchart illustrating a device control method performed by device control apparatus of FIG. 2, according to an embodiment of the present invention;

FIG. 8 is a flowchart illustrating a device control method performed by the device control apparatus of FIG. 2, according to an embodiment of the present invention;

FIG. 13 is a block diagram illustrating a network based on a device control apparatus, according to an embodiment of the present invention.

DETAILED DESCRIPTION OF EMBODIMENTS OF THE PRESENT INVENTION

Figure 1:
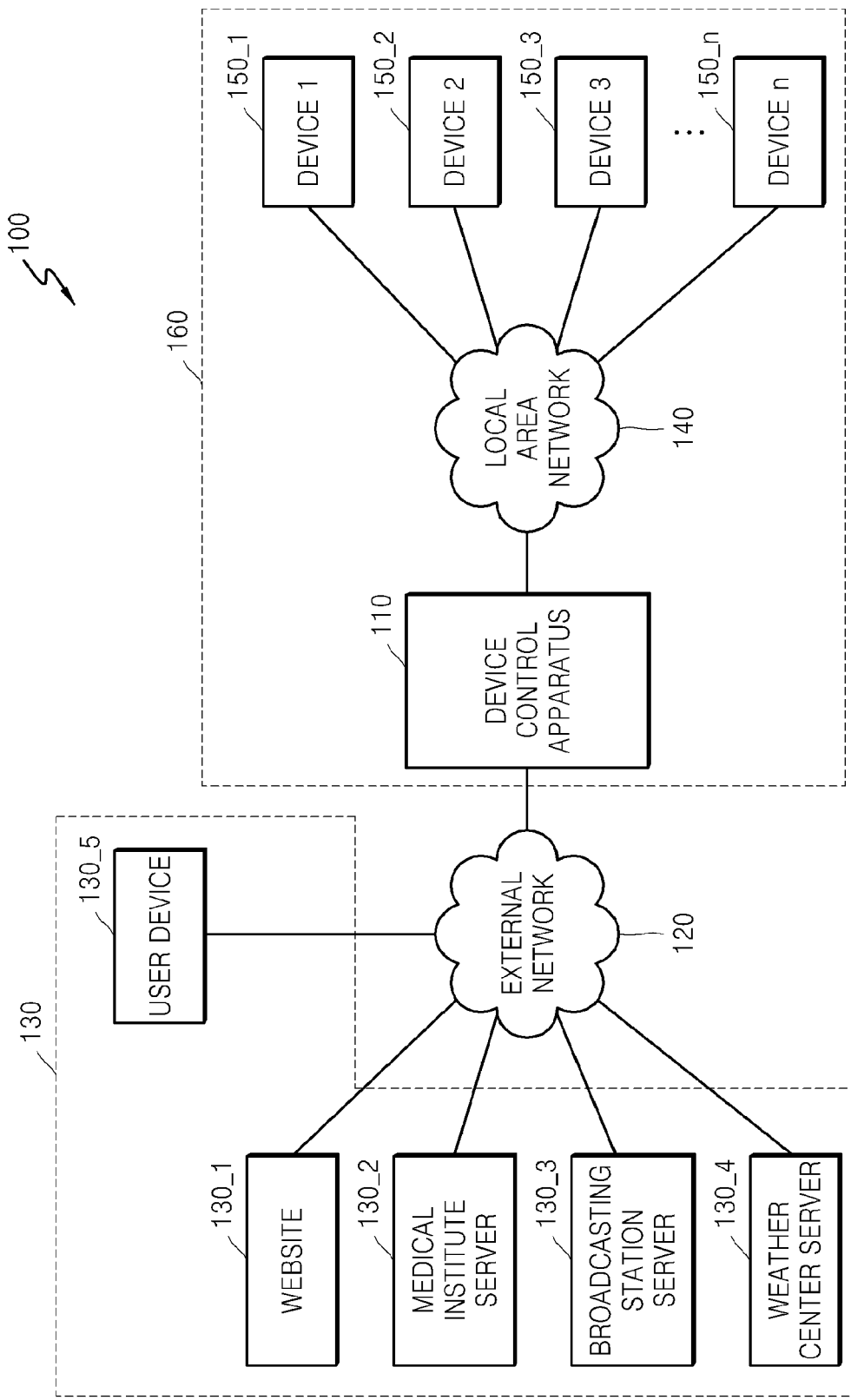
FIG. 1 is a block diagram illustrating a network based on a device control apparatus, according to an embodiment of the present invention.

Hereinafter, embodiments of the present invention will be described with reference to the accompanying drawings. In the following description, the same elements will be designated by the same reference numerals although they are shown in different drawings. Further, various definitions found in the following description, such as specific values of packet identifications, contents of displayed information, and the like, are provided only to help with the general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention unclear. FIG. 1 is a block diagram illustrating a network 100 based on a device control apparatus 110, according to an embodiment of the present invention, in which a user device 130_5 can be accessed over an external network 120.

Referring to FIG. 1, the network 100 includes the device control apparatus 110, the external network 120, a region 130 accessible by the device control apparatus 110 over the external network 120, and a region 160 accessible and controllable by the device control apparatus 110 over a local area network 140.

The external network 120 may include at least one of networks, such as Internet, a mobile communication network, a broadcasting network, a cable TV network, and a satellite network, but the present invention is not limited thereto. The external network 120 may be an external service network or an external access network.

The region 130 includes a website 130_1, a medical institute server 130_2, a broadcasting station server 130_3, a weather center server 130_4, a user device 130_5, and the like. However, the members of the region 130 are not limited thereto. The website 130_1, the medical institute server 130_2, the broadcasting station server 130_3, the weather center server 130_4, and the user device 130_5 may be information providers for providing the device control apparatus 110 with information over the external network 120. However, the website 130_1, the medical institute server 130_2, the broadcasting station server 130_3, the weather center server 130_4, and the user device 130_5 included in the region 130 may be service providers for providing the device control apparatus 110 with services over the external network 120.

The website 130_1, the medical institute server 130_2, the broadcasting station server 130_3, the weather center server 130_4, and the user device 130_5 included in the region 130 may provide information according to the requirements of the device control apparatus 110. The website 130_1, the medical institute server 130_2, the broadcasting station server 130_3, the weather center server 130_4, and the user device 130_5 included in the region 130 may provide the device control apparatus 110 with at least one of outdoor environment information and user information. The user device 130_5 may provide the device control apparatus 110 with control information corresponding to guide information based on control information regarding a selected device transmitted from the device control apparatus 110. The guide information may be a question (or a message, or a query) based on the control information of the selected device. If the selected device is an air conditioner, and the control information is power on, the guide information may be a question, such as a sentence "Do you want to power on an air conditioner?". The control information corresponding to the guide information may be configured simply as "yes, no," but may also be configured as specific data or detailed data. The specific data or detailed data may be numerical data or data expressing a function of the selected device. The control information corresponding to the guide information may be transmitted or received based on a control command of the selected device, a response signal to the guide information, or the guide information.

The website 130_1, the medical institute server 130_2, the broadcasting station server 130_3, the weather center server 130_4, and the user device 130_5 included in the region 130 may include a database. The database included in the website 130_1, the medical institute server 130_2, the broadcasting station server 130_3, the weather center server 130_4, and the user device 130_5 included in the region 130 may be an external database with respect to the device control apparatus 110. If a database server (not shown) is included in the region 130, the database server may also be the external database. The device control apparatus 110 may search for the outdoor environment information and the user information from the external database based on the region 130. If at least one of devices 1 to n 150_1 through 150_*n* includes the database, the database may be also the external database with respect to the device control apparatus 110. The device control apparatus 110 may search for the user information in the external database based on the devices 1 to n 150_1 through 150_*n*.

The user device 130_5 is related to at least one of the devices 1 to n 150_1 through 150_*n* controlled by the device control apparatus 110. For example, if the devices 1 to n 150_1 through 150_*n* are home-based devices, the user device 130_5 may be a device of a person among people lived in a home. The region 130 may include a plurality of user devices. For example, if people lived in the home are 3, the region 130 may include at least one user device in addition to the user device 130_5, and the device control apparatus 110 may be a user device of a person among people lived in the home.

The user device 130_5 may be a mobile device. The mobile device may be portable devices such as a cellular phone, a smartphone, a Personal Digital Assistant (PDA), a Portable Multimedia Player (PMP), a navigation device, but the mobile device is not limited thereto.

The local area network 140 is a network based on a wireless protocol, such as Zigbee®, Wi-Fi, Bluetooth®, Institute of Electrical and Electronics Engineers (IEEE) 802.11, Home Radio Frequency (RF), Infrared Data Association (IrDA), Ultra WideBand (UWB) and wireless 1394, or based on a wired protocol, such as Ethernet, Home Phoneline Networking Alliance (PNA), Power Line Communications (PLC), IEEE 1394, and Universal Serial Bus (USB), and may be an indoor based network or a home-based network, but the present invention is not limited thereto. The local area network 140 may be a combination of wireless and wired networks. The local area network 140 is not limited to the indoor network because at least one of the devices 1 to n 150_1 through 150_*n* may be outdoors. For example, a device such as one that controls the lighting in front of a porch, a lawn sprinkler, and the like, may be a home-based device or outdoors.

The devices 1 to n 150_1 through 150_*n* may be accessible and controllable by the device control apparatus 110 over the local area network 140. For example, if the devices 1 to n 150_1 through 150_*n* are home-based devices, the devices 1 to n 150_1 through 150_*n* may include a refrigerator, a washing machine, a TV set, an air conditioner, a humidifier, an air cleaner, a lighting, a boiler, a robot cleaner, a dishwasher, an oven, a stove, a window, a sprinkler, a mobile device (e.g., a mobile phone), and the like, but the present invention is not limited thereto.

The devices 1 to n 150_1 through 150_*n* may be determined according to the purpose of the region 160 in which the devices 1 to n 150_1 through 150_*n* are installed. For example, if the purpose of the region 160 is a home base region, the devices 1 to n 150_1 through 150_*n* may include the home-based devices stated above. For example, if the purpose of the region 160 is an office based region, the devices 1 to n 150_1 through 150_*n* may be office devices, lightings, windows, air cleaners, mobile phones, and the like. The devices 1 to n 150_1 through 150_*n* are network-based devices. The region 160 may be accessible and controllable by the device control apparatus 110 over the local area network 140, and may be space-based regions such as home, an office, an office building, a factory, and the like.

The device control apparatus 110 may access the information provider 130 over the external network 120, and control at least one of the devices 1 to n 150_1 through 150_*n* accessible over the local area network 140. The device control apparatus 110 may be a mash-up service apparatus based on control of at least one device accessible over the local area network 140, a home controller, a control point, a home network server or a home automation system in combination of a home gateway and a home server, and a remote home controller in a Machine-to-Machine (M2M), but the present invention is not limited thereto. The device control apparatus 110 may further include a function of collecting indoor environment information.

The device control apparatus 110 may be implemented as a mobile apparatus. If the device control apparatus 110 is a mobile apparatus, the device control apparatus 110 may be an apparatus of a person different from that of the user device 130_5. For example, if the region 160 is the home-based region, and the device control apparatus 110 is a mobile apparatus of a one resident of the home, the user device 130_5 may be a mobile device of another resident.

The device control apparatus 110 and the local area network 140 are installed or exist in a space-based region that is physically shared with the devices 1 to n 150_1 through 150_*n*, and, thus, the region 160 may include the device control apparatus 110, the local area network 140, and the devices 1 to n 150_1 through 150_*n*.

The device control apparatus 110 may be configured as shown in FIG. 2. FIG. 2 is a block diagram illustrating a device control apparatus 200, according to an embodiment of the present invention. The device control apparatus 200 may be implemented to operate on the basis of only outdoor environment information, on the basis of outdoor environment information and user information, or on the basis of only user information.

Referring to FIG. 2, the device control apparatus 200 includes a first network interface unit 210, a storage unit 220, a second network interface unit 230, a user interface unit 240 including an input unit 241 and an output unit 242, and a processor 250. The device control apparatus 200 of FIG. 2 may be implemented as shown more or less in FIG. 2. For example, the device control apparatus 200 may be implemented not to include the user interface unit 240 or to include the storage unit 220 in the processor 250.

The first network interface unit 210 provides an interface function of transmitting and receiving data between the external network 120 and the processor 250. According to the implementation of the device control apparatus 200, the data received through the first network interface unit 210 may include control information corresponding to guide information based on the outdoor environment information and control information regarding a selected device, control information corresponding to guide information based on the outdoor environment information, the user information, and the control information regarding the selected device, or control information corresponding to guide information based on the user information and the control information regarding the selected device.

The outdoor environment information may include at least one piece of information, such as weather, temperature, humidity, intensity of wind, a degree of air pollution (for example, Asian Dust), security, traffic, life care, energy consumption, sunshine, and the like. The outdoor environment information may be public information or public data. The user information will be described in detail referring to FIG. 6.

The storage unit 220 stores program and data necessary for performing a device control method according to an embodiment of the present invention. The program may operate after being loaded onto the processor 250. The program stored in the storage unit 220 may be previously stored although the program may be stored after being downloaded through the first network interface unit 210. The data may include information regarding the devices 1 to n 150_1 through 150_*n* and information of user devices corresponding to the devices 1 to n 150_1 through 150_*n* according to an embodiment of the present invention. However, the data stored in the storage unit 20 may include various types of data that will be described later.

The information regarding the devices 1 to n 150_1 through 150_*n* may be configured in a table including a linkage between names of the devices 1 to n 150_1 through 150_*n* and the outdoor environment information, that is, table 1 below. However, the table including a linkage between the names of the devices 1 to n 150_1 through 150_n and the outdoor environment information is not limited to table 1 below.

the storage unit 220 when each device is installed. For example, if function information of the device 3 150_3 includes a cleaning function, the processor 250 may select a

TABLE 1

| | Information | | | | | | | | | |
|---|---|---|---|---|---|---|---|---|---|---|
| Devices | weather | temperature | humidity | intensity of wind | air pollution | security | traffic | Life care | energy consumption | Amount of sunlight |
| refrigerator | | | | | | | | | o | |
| washing machine/ drying machine | o | | | o | | | | o | | |
| TV | o | | | | | | | | | |
| air conditioner | o | o | o | | | | | | o | |
| humidifier | | | o | | o | | | o | | |
| air cleaner | o | | o | o | o | | | | o | |
| lighting | o | | | | | o | | | | o |
| boiler | | | | | | | | | o | |
| robot cleaner | | | | o | o | | | | | |
| dish cleaner | | | | | | | | | o | |
| oven/cook top | | | | | | | | | | |
| window | o | | | o | o | | | | | o |
| sprinkler | o | | | | | | | | | o |
| mobile phone | o | | | | o | o | o | o | o | |

The information of user devices corresponding to the devices 1 to n 150_1 through 150_n is determined according to at least one of usage history information regarding each device, location information thereof, and attribute information thereof. The information regarding user devices may use identifying information of each device. For example, a cellular phone number may be used as the information of a user device.

The usage history information of each device may be collected by monitoring each device in the processor 250 through the second network interface unit 230 and stored in the storage unit 220. The usage history information of each device may include information regarding a user who frequently uses each device. For example, if three users share the region 160, and user A of the three users most frequently uses the device 1 150_1, the usage history information of the device 1 150_1 may include information regarding A. The processor 250 may select a user device-based on the information regarding user A.

The location information of each device is physical location information in the region 160, may be input from the input unit 241 of the user interface unit 240 or collected by monitoring each device in the processor 250 through the second network interface unit 230. For example, if the device 2 150_2 is a refrigerator, location information of the device 2 150_2 may be a kitchen. The processor 250 may select the user device-based on the location information that is the kitchen. In this regard, information indicating a role of each user or information regarding relationships between users may be further used. For example, if user B plays a role of spending much time mainly in the kitchen, the processor 250 may select a user device of B based on the location information that is the kitchen. The information indicating the role of each user or the information regarding relationships between users may be previously stored in the storage unit 220.

The attribute information of each device may include function information of each device. The attribute information of each device may be input from the input unit 241 of the user interface unit 240 or collected by the processor 250 through the second network interface unit 230 and stored in the storage unit 220 when each device is installed. For example, if function information of the device 3 150_3 includes a cleaning function, the processor 250 may select a user device-based on the cleaning function information. In this regard, the information indicating the role of each user or the information regarding relationships between users that have been previously stored in the storage unit 220 may be used.

The second network interface unit 230 provides an interface function of transmitting and receiving data between the local area network 140 of FIG. 1 and the processor 250.

The user interface unit 240 interfaces between the device control apparatus 200 and a user. The user interface unit 240 may input an input signal such as a touch-based signal, a key-based signal, and a mouse manipulation based signal, and output control information regarding a selected device, but the input signal and an output signal are not limited thereto.

The user interface unit 240 may include the input unit 241 that inputs the input signal and the output unit 242 that outputs the output signal. A signal input through the user interface unit 240 may be analyzed as a signal input through the input unit 241. A signal output through the user interface unit 240 may be analyzed as a signal output through the output unit 242. The output unit 242 may be a display device. If the output unit 242 is the display device, the output unit 242 may be the display device, such as, Liquid Crystal Display (LCD), Light-Emitting Diode (LED), and Active Matrix Organic Light-Emitting Diode (AMOLED). However, the user interface unit 240 is not limited thereto.

The processor 250 controls all functions of the device control apparatus 200 and may be a controller or a microprocessor, but the present invention is not limited thereto. The processor 250 selects at least one device from information regarding at least one device stored in the storage unit 220 based on at least one of the user information and at least one piece of the outdoor environment information received through the first network interface unit 210, and generates information used to control the selected device based on the received outdoor environment information.

The processor 250 may operate as shown in FIG. 3. FIG. 3 is a flowchart illustrating a device control method performed by the device control apparatus 200 of FIG. 2, according to an embodiment of the present invention, in which the devices 1 to n 150_1 through 150_n are controlled based on outdoor environment information.

Referring to FIG. 3, in step S301, the processor 250 selects at least one device based on received outdoor environment information. That is, the processor 250 selects at least one device by detecting and analyzing the outdoor environment information from information received through the first network interface unit 210. FIG. 4 is a flowchart illustrating a method of selecting at least one device based on the outdoor environment information of FIG. 3, according to an embodiment of the present invention.

Referring to FIG. 4, in step S401, the processor 250 detects the outdoor environment information from the information received through the first network interface unit 210. A method of detecting the outdoor environment information from the received information may be performed based on previously determined field identifying information. That is, the processor 250 may detect identifying information indicating a previously determined outdoor environment information field from the received information, and detect information included in a data field of a field including the detected identifying information as the outdoor environment information.

If at least one piece of the outdoor environment information is detected from the received information, the processor 250 detects a keyword corresponding to the detected outdoor environment information by analyzing the detected outdoor environment information in step S402. The keyword corresponding to the detected outdoor environment information may be weather, temperature, humidity, intensity of wind, a degree of air pollution (for example, yellow dust), security, traffic, life care, energy consumption, amount of sunlight, etc. as listed in Table 1.

The outdoor environment information may be analyzed by comparing the received outdoor environment information and a previously set reference value. For example, if the previously set reference value is 25° C., and the received outdoor environment information is 28° C., the processor 250 compares the two values. As a result of comparison, since the temperature of the received outdoor environment information is 3° C. higher than that of the previously set reference value, the processor 250 may determine that a temperature is necessarily adjusted and detected the keyword corresponding to the outdoor environment information as the temperature. If the temperature of the received outdoor environment information is the same as that of the previously set reference value, the processor 250 may determine that the temperature is not necessarily adjusted and exclude the temperature as the keyword corresponding to the outdoor environment information. The previously set reference value may be set based on information input through the user interface unit 240 or set default. The keyword corresponding to the outdoor environment information may be outdoor environment information type information.

The processor 250 may detect the keyword corresponding to the outdoor environment information by analyzing content of the received information. For example, if the content of the received information is that "weather is good today," the processor 250 may detect the keyword corresponding to the outdoor environment information as "weather." If the content of the received information is that "energy consumption increases," the processor 250 may detect the keyword corresponding to the outdoor environment information as "energy consumption." If the content of the received information is that "air pollution is high, and cold patients or flu patients rapidly increase," the processor 250 may detect the keyword corresponding to the outdoor environment information as "air pollution" and "life care." If the content of the received information is that "it is cloudy," the processor 250 may detect the keyword corresponding to the outdoor environment information as "sunshine." If the content of the received information is that "gas consumption is increasing," the processor 250 may detect the keyword corresponding to the outdoor environment information as "energy consumption." If the content of the received information is "traffic accident information," the processor 250 may detect the keyword corresponding to the outdoor environment information as "traffic." The keyword may be determined based on the outdoor environment information used in a table like Table 1 stored in the storage unit 220. The processor 250 may include a dictionary function or a vocabulary analysis function to detect the keyword from the content of the received information as described above. The vocabulary analysis function may be a morpheme analysis library based function.

The processor 250 searches for information regarding devices from the storage unit 220 based on the keyword corresponding to the detected outdoor environment information in step S403. For example, if the keyword corresponding to the detected outdoor environment information is "energy consumption," the processor 250 may search for "a refrigerator, an air conditioner, an air cleaner, a boiler, a dishwasher, and a mobile phone" as the information regarding devices based on Table 1 stored in the storage unit 220. If the keyword corresponding to the detected outdoor environment information is "humidity, air pollution, and life care information," the processor 250 may search for "a humidifier" as the information regarding devices based on Table 1 stored in the storage unit 220. For example, if the keyword corresponding to the detected outdoor environment information is "humidity and air pollution," the processor 250 may search for "a humidifier and an air cleaner" as the information regarding devices based on Table 1 stored in the storage unit 220. For example, if the keyword corresponding to the detected outdoor environment information is "weather," the processor 250 may search for "a washing machine/drying machine, a TV, an air conditioner, an air cleaner, lighting, a window, a sprinkler, and a mobile phone" as the information regarding devices based on Table 1 stored in the storage unit 220.

If the information regarding devices is searched as described above, the processor 250 selects a related device among the found devices based on the received outdoor environment information in step S404. For example, if "a refrigerator, an air conditioner, an air cleaner, a boiler, and a dishwasher" are searched as the information regarding devices by using a keyword "energy consumption," and the received outdoor environment information is "an increase in energy consumption of a current city," the processor 250 may select an "air conditioner" having the largest power consumption. The attribute information of devices stored in the storage unit 220 may be used to allow the processor 250 to select the device. The attribute information of devices may include specification information of each device as well as the function information of devices stated above.

If at least one device is selected, the processor 250 generates information used to control the selected device based on the outdoor environment information of FIG. 3 in step S302. For example, if the temperature of the received outdoor environment information is 3° C. higher than that of the previously set reference value as described above, the processor 250 may generate control information used to operate an air conditioner. The control information used to operate the air conditioner may be information used to simply turn the air conditioner on. However, the control information used to operate the air conditioner may be information used to control a specific function of the air conditioner based on the relation between an indoor temperature and an outdoor temperature. Thus, the processor 250 may control a corresponding device through the second network interface unit 240 based on the control information generated in step S302.

Figure 5:
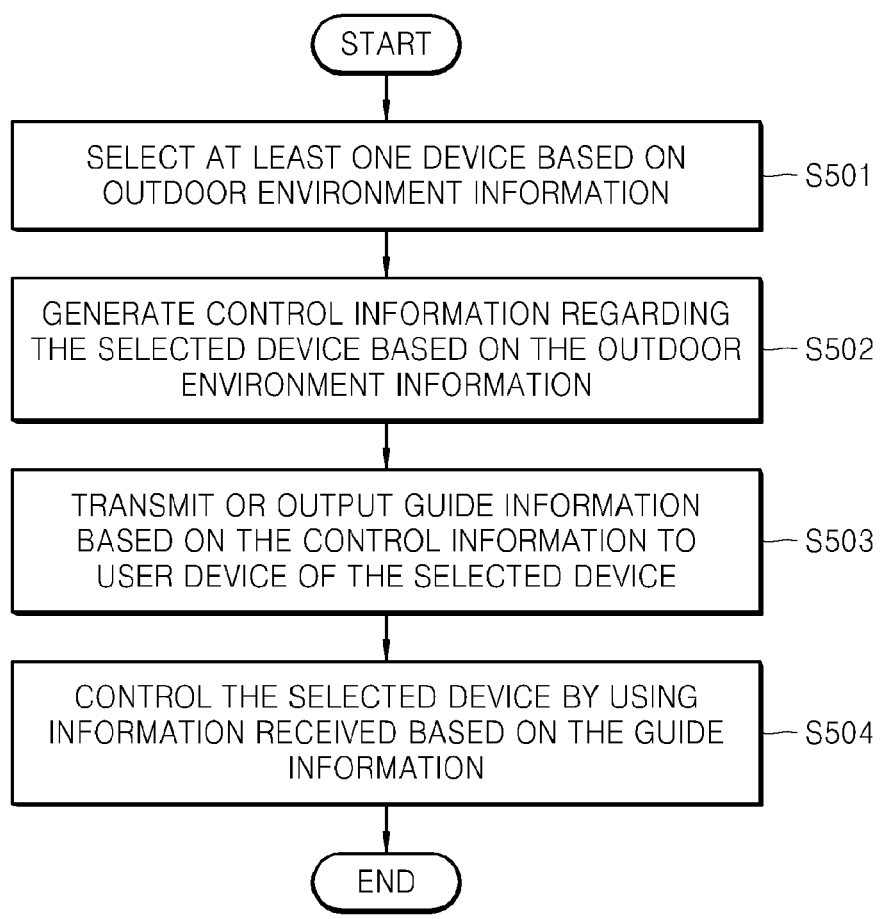
FIG. 5 is a flowchart illustrating a device control method performed by the device control apparatus of FIG. 2, according to an embodiment of the present invention.

FIG. 5 is a flowchart illustrating a device control method performed by the device control apparatus of FIG. 2, according to an embodiment of the present invention, in which a function of transmitting the control information generated in FIG. 3 to the user device 130_5 or outputting the control information to the output unit 242 of the user interface unit 240 is added.

Thus, steps S501 and S502 of FIG. 5 are the same as steps S301 and S302 of FIG. 3, and thus descriptions thereof will be omitted here to avoid a redundant description.

In step S503, the processor 250 transmits guide information based on the control information generated in step S502 to the user device 130_5 of a selected device or outputs the guide information to the output unit 242. If control information that is the same as that generated in step S302 of FIG. 3 is generated, the guide information may be "would you like to turn the air conditioner on?" and "would you like to set a desired temperature of an air conditioner as 25° C.?," but the present invention is not limited thereto. The user device 130_5 of the selected device may be selected on the same standard as described with reference to FIGS. 1 and 2. The user device 130_5 may be a main user device because the user device 130_5 may be selected based on at least one of usage history information regarding the selected device of FIG. 2, location information thereof, and attribute information thereof, and a plurality of user devices may be selected according to the standard described above.

In step S504, the processor 250 controls the selected device by using the received information based on the transmitted or output guide information. The received information based on the guide information may be simply "yes, no" or may be specific data or detailed data. The specific data or detailed data may be numerical data or data expressing a function of the selected device. The received information based on the guide information may be a control command of the selected device. The processor 250 may transmit a signal used to control the selected device based on the received data to the selected device through the second network interface unit 230. Accordingly, the selected device operates.

Figure 6:
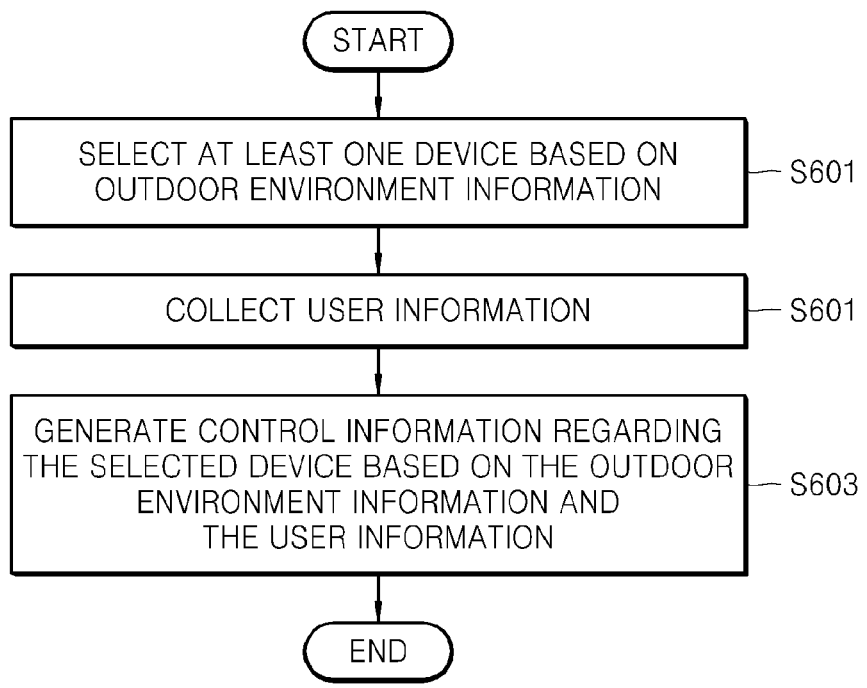
FIG. 6 is a flowchart illustrating a device control method performed by a device control apparatus of FIG. 2, according to an embodiment of the present invention.

FIG. 6 is a flowchart illustrating a device control method performed by the device control apparatus of FIG. 2, according to an embodiment of the present invention, in which control information regarding a device selected based on outdoor environment information and user information is generated. Step S601 of FIG. 6 is the same as step S301 of FIG. 3, and, thus, a description thereof will be omitted here to avoid a redundant description.

In step S602, the processor 250 collects user information. The user information may be collected by searching for an external database through the first network interface unit 210 and the second network interface unit 230 or an internal database stored in the storage unit 220. The internal database stored in the storage unit 220 may be configured by access to at least one device through the second network interface unit 230, as data downloaded through the first network interface unit 210, or as information input by the input unit 241 of the user interface unit 240.

The collectable user information may include Personal Information Management System (PIMS) or PIM based information. The user information may include, for example, user business trip information, user outing information, and user health information. The user business trip information and the user outing information may be based on user input information, the user health information may be user medical treatment information or the user input information, but the present invention is not limited thereto. The user medical treatment information may be provided from the medical institute server 130_2 through the first network interface unit 210.

The user information may include information indicating whether at least one user exists in the region 160 of FIG. 1. For example, if the region 160 is a home-based region, the user information may include information indicating whether at least one user exists in the home-based region.

The information indicating whether at least one user exists in the region 160 may be collected, for example, based on a location of a mobile device of a user previously registered in the storage unit 220. That is, if the location of the mobile device of the previously registered user collected through the first network interface unit 210 is in the region 160, the processor 250 may obtain the user information indicating that at least one user exists in the region 160. The location of the mobile device of the previously registered user may be detected by using a Global Positioning System (GPS) or base station based location information. Alternatively, if the processor 250 monitors a device status through the second network interface unit 230 and determines that the mobile device of the previously registered user exists in the region 160, the processor 250 may obtain the user information indicating that at least one user exists in the region 160. The processor 250 may monitor the device status by transmitting a message periodically requiring a reply. Identifying information of a device may be used to transmit or receive the message.

In step S603, the processor 250 generates control information regarding the selected device based on the outdoor environment information and the user information. For example, if the outdoor environment information regarding a traffic accident is received, and the PIMS information included in the user information includes a schedule to visit a place where the traffic accident occurred, the processor 250 may generate control information indicating that a path not passing through the place the traffic accident occurred is recommended as a path for visiting the place when a navigation application of a selected mobile phone is executed.

Alternatively, if the outdoor environment information indicating weather relating to rain at a time of an outing of a user based on the user information is received, the processor 250 generates control information in such a way that an image relating to weather is provided on a background screen of a selected mobile phone or a screen of a selected TV, and, thus, the user does not forget an umbrella while the user is out. If the outdoor environment information relating to security is received, and no user exists in the region 160 based on the user information, the processor 250 may generate control information indicating that selected lighting is turned on. If the outdoor environment information regarding sunshine that it is cloudy is received, and at least one user exists in the region 160 based on the user information, the processor 250 may generate control information indicating that illumination of selected lighting has become brighter, a selected window is closed, and a sprinkler of a selected garden is stopped.

FIG. 7 is a flowchart illustrating a device control method performed by the device control apparatus 200 of FIG. 2, according to an embodiment of the present invention, in which the device control apparatus 200 is a mobile device and has left the region 160, compared to the embodiment of FIG. 3. Thus, steps S701 and S702 of FIG. 7 are the same as steps S301 and S302 of FIG. 3, and, thus, descriptions thereof will be omitted here to avoid a redundant description.

In step S703, the processor 250 determines if the device control apparatus 200 has left the region 160. The determination may be performed by the processor 250 by detecting location information of the device control apparatus 200 by using a GPS or base station based location information detection method or may be performed based on input information of a user who uses the input unit 241 of the user interface unit 240. If the processor 250 determines that the device control apparatus 200 has left the region 160, the processor 250 transfers a control right to at least one of the devices 1 to n 150_1 through 150_n in step S704. The transfer of the control right may be performed based on information regarding previously set candidate devices. The information regarding candidate devices is previously stored in the storage unit 220.

The transfer of the control right according to the leaving of the device control apparatus 200 may be determined by transmitting a message periodically which is to be replied to the device control apparatus 200 by one of the devices 1 to n 150_1 through 150_n having a coordinator function, and then the control right may be transferred to a candidate device having the highest priority among candidate devices stored in the device having the coordinator function according to a result of the determining.

The embodiments that were described with reference to FIGS. 3 through 6 and will be described with reference to FIGS. 8, 9, 11, and 12 may be modified to further include steps S703 and S704 of FIG. 7.

FIG. 8 is a flowchart illustrating a device control method performed by the device control apparatus 200 of FIG. 2, according to an embodiment of the present invention, in which a device is controlled based on collected user information.

In step S801, the processor 250 collects user information. The processor 250 collected the user information by searching for at least one of the external database and the internal database of the device control apparatus 200 stated above.

In step S802, the processor 250 selects at least one device based on the collected user information and generates control information regarding the selected device. At least one device may be selected based on the collected user information by using a table prepared according to the relationship between the user information stored in the storage unit 220 and devices. The table may be defined as in Table 1. For example, if a user who caught a cold selects a boiler, and does not exist in the region 160, the processor 250 may select at least one device by using the table like selecting lighting and a window. If at least one device is selected, the processor 250 generates the control information regarding the selected device based on the user information. The control information may include information indicating that the boiler is turned on, for example, if the boiler is selected above, and lighting is turned completely off and the windows are entirely closed if lighting and a window are selected above. The processor 250 may control the selected device through the second network interface unit 230 according to the control information.

Figure 9:
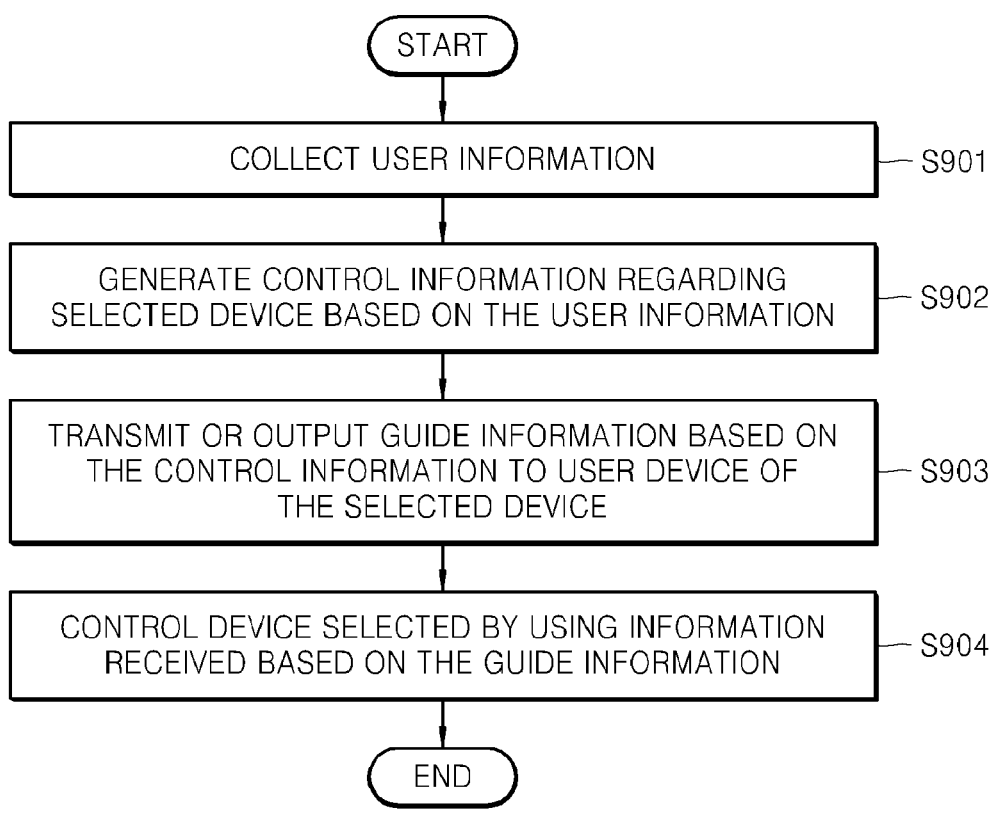
FIG. 9 is a flowchart illustrating a device control method performed by the device control apparatus of FIG. 2, according to an embodiment of the present invention.

FIG. 9 is a flowchart illustrating a device control method performed by the device control apparatus 200 of FIG. 2, according to an embodiment of the present invention, in which steps S503 and S504 are added to the embodiment described with respect to FIG. 8. Thus, steps S901 and S902 of FIG. 9 are the same as steps S801 and S802 of FIG. 8, and steps S903 and S904 of FIG. 9 are the same as steps S530 and S504 of FIG. 5, and thus descriptions thereof will be omitted here to avoid a redundant description. Referring to FIG. 9, when a selected device is controlled based on user information, the user device 130_5 or the input unit 241 of the user interface unit 240 may be used.

Figure 10:
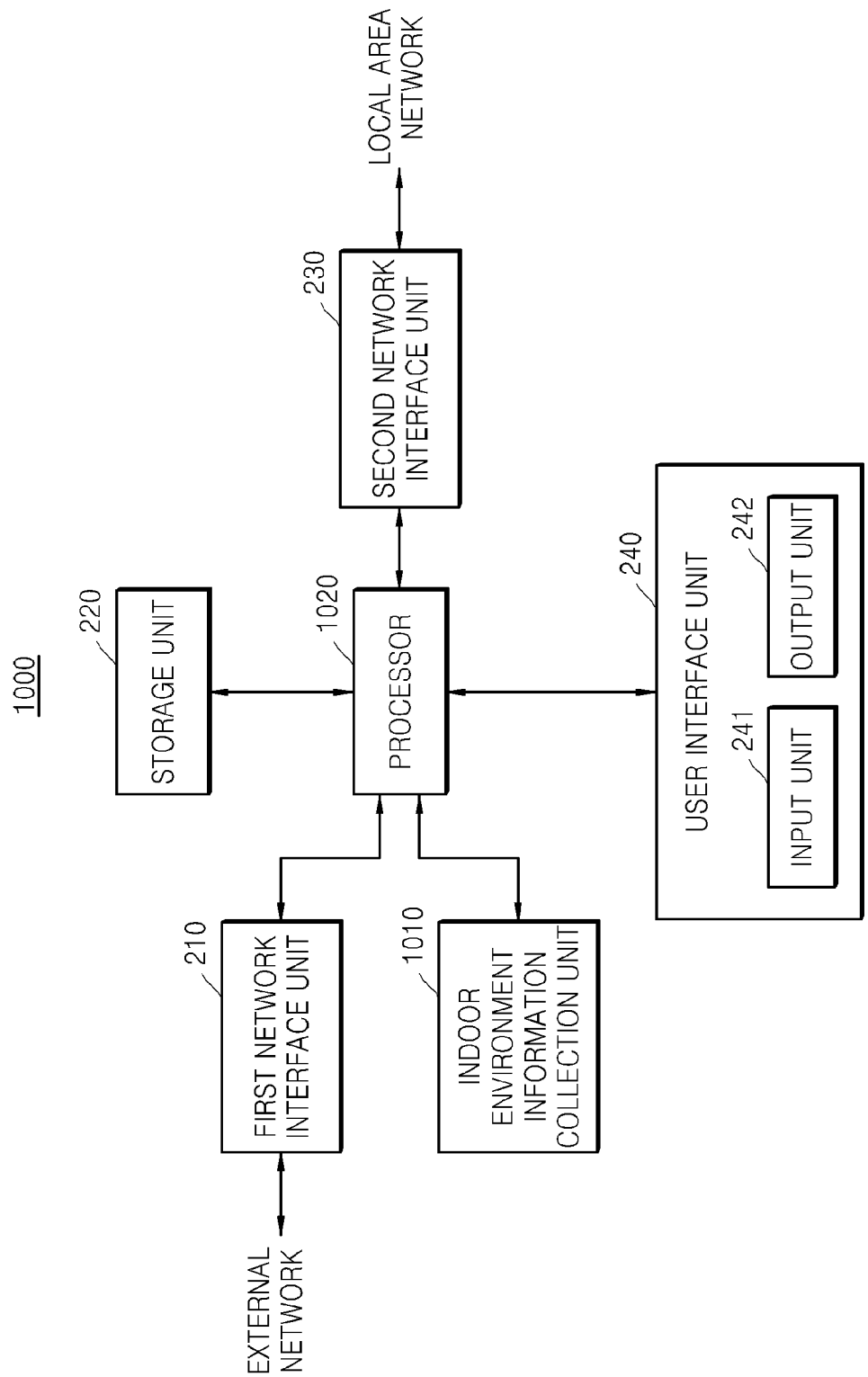
FIG. 10 is a block diagram illustrating a device control apparatus, according to an embodiment of the present invention.

FIG. 10 is a block diagram illustrating a device control apparatus 1000, according to an embodiment of the present invention, in which the device control apparatus 200 of FIG. 2 further includes a function of collecting indoor environment information. The parts with the same reference numerals between FIGS. 2 and 10 may be interpreted to perform the same functions. The parts of the device control apparatus 1000 of FIG. 10 may be more or less than those shown in FIG. 10.

An indoor environment information collection unit 1010 may collect indoor environment information based on various sensors. The indoor environment information may include at least one of temperature, humidity, and air pollution but the present invention is not limited thereto. Various sensors included in the indoor environment information collection unit 1010 may include sensors for collecting the indoor environment information.

A processor 1020 may select a device based on at least one of the indoor environment information, at least one of outdoor environment information and user information received through the first network interface unit 210, and user information received through the second network interface unit 230 and generate control information of the selected device.

Figure 11:
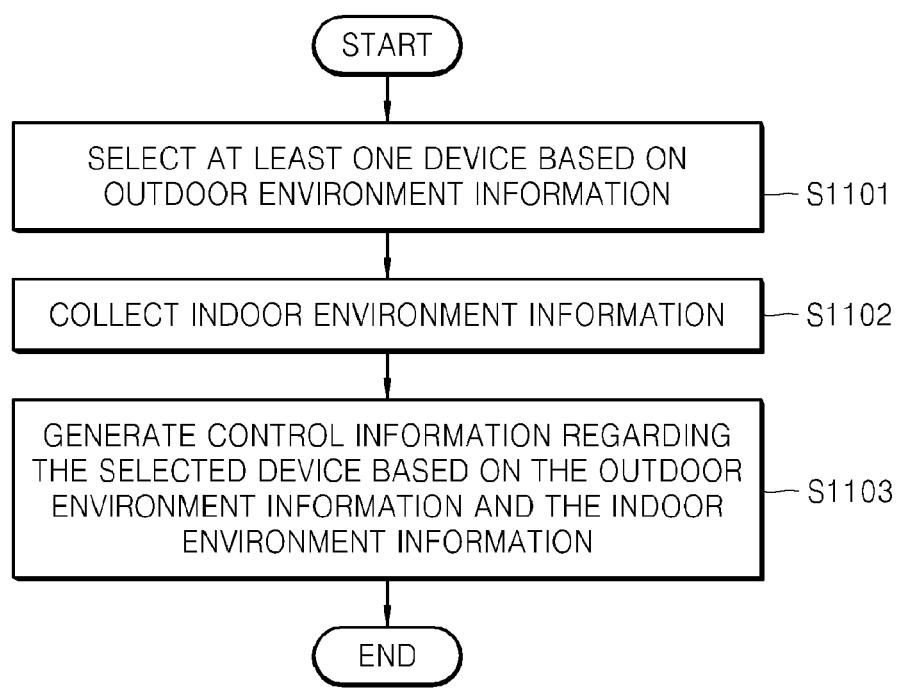
FIG. 11 is a flowchart illustrating a device control method performed by the device control apparatus of FIG. 10, according to an embodiment of the present invention.

That is, the processor 1020 may operate as shown in FIG. 11. FIG. 11 is a flowchart illustrating a device control method performed by the device control apparatus 1000 of FIG. 10, according to an embodiment of the present invention, in which a device is controlled based on outdoor and indoor environment information. Step S1101 of FIG. 11 is the same as step S301 of FIG. 3, and, thus, a description thereof will be omitted here to avoid a redundant description.

In step S1102, the processor 1020 collects the indoor environment information through the indoor environment information collection unit 1010. In step S1103, the processor 1020 generates control information regarding a device selected in step S1101 based on the collected indoor and outdoor environment information. For example, if the outdoor environment information has a temperature of 28° C., and the indoor environment information has a temperature of 22° C., since a temperature difference between the two is 6° C., the processor 1020 generates control information indicating that a selected air conditioner operates in order to adjust the temperature difference of 6° C. If a desired temperature is previously set, the processor 1020 may be implemented to generate the control information only when an indoor temperature is higher than the desired temperature.

The embodiment of FIG. 11 may be modified to further include steps S503 and S504 of FIG. 5. If the embodiment of FIG. 11 is modified to further include steps S503 and S504 of FIG. 5, the processor 1020 may transmit guide information based on the generated control information to the user device 130_5, or output the guide information to the output unit 242 of the user interface unit 240, and control the device selected by information received based on the guide information.

Figure 12:
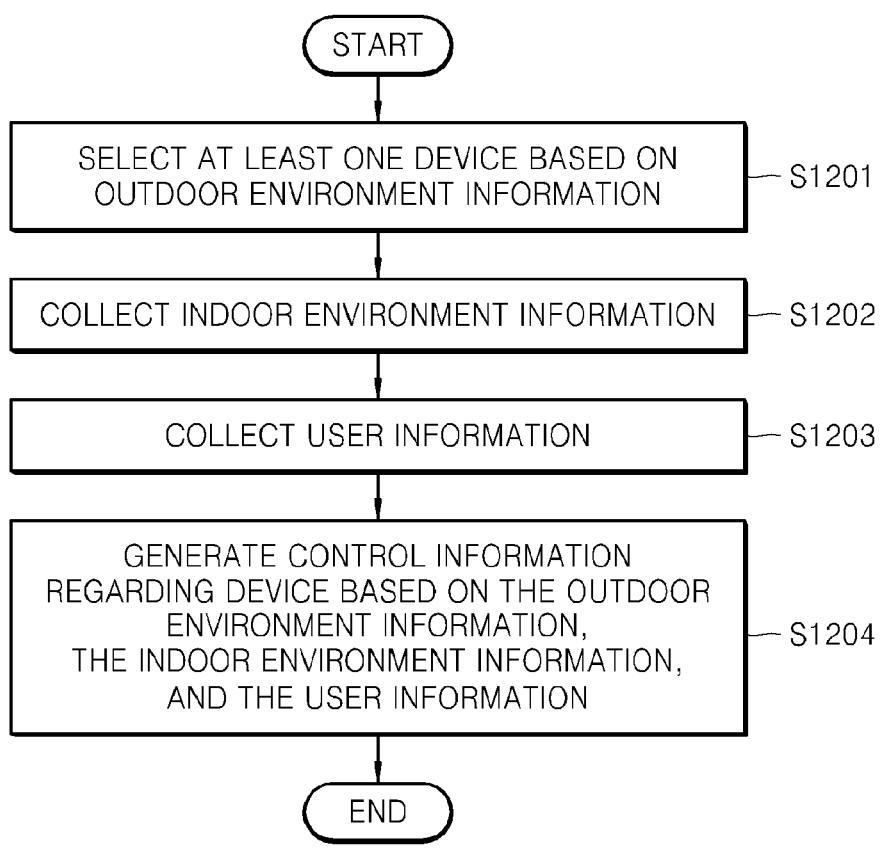
FIG. 12 is a flowchart illustrating a device control method performed by the device control apparatus of FIG. 10, according to an embodiment of the present invention.

FIG. 12 is a flowchart illustrating a device control method performed by the device control apparatus 1000 of FIG. 10, according to an embodiment of the present invention, in which a device is controlled based on outdoor environment information, indoor environment information, and user information. That is, the embodiment of FIG. 12 further includes a step of collecting the user information in addition to the embodiment of FIG. 11. Steps S1201 and S1202 of FIG. 12 are the same as steps S1101 and S1102 of FIG. 11, and thus descriptions thereof will be omitted here to avoid a redundant description.

In step S1203, the processor 1020 collects the user information by searching at least one of internal database stored in the storage unit 220 and external database described above. The user information may be at least one of business trip information, outing information, and PIMS or PIM based information as described above, but the present invention is not limited thereto. If the processor 1020 searches for the user information through the external database, the processor 1020 may search for the user information from the user device 130_5 that is to transmit control information. A method of searching for the user information may be performed based on identifying information for users.

In step S1204, the processor 1020 generates control information regarding a selected device based on the collected indoor and outdoor environment information and user information. For example, if the outdoor environment information has a temperature of 28° C., and the indoor environment information has a temperature of 22° C., since a temperature difference the two is 6° C. while a user is currently absent, the processor 1020 may not generate control information. However, if the temperature difference the two is 6° C., and the user is diagnosed as having a cold based on medical treatment record information of the user, the processor 1020 may generate control information indicating that an air conditioner operates according to a temperature difference between an appropriate indoor temperature and a currently collected indoor temperature as described above.

The embodiment of FIG. 12 may be modified to further include steps S503 and S504 of FIG. 5.

If the user device 130_5 of FIG. 1 exists in the region 160 through the local area network 140, the network of FIG. 1 may be reconfigured as shown in FIG. 13. FIG. 13 is a block diagram illustrating a network 1300 based on a device control apparatus 1310, according to an embodiment of the present invention, in which a device 1 1330_1 corresponds to the user device 130_5 of FIG. 1.

The device control apparatus 1310 may access a device 1 1330_1 based on one of a Local Area Network (LAN) 1320 and the external network 120. In this regard, the device 1 1330_1 may be a mobile device like the user device 130_5. If the device 1 130_1 and the device control apparatus 1310 are mobile devices, the device 1 1330_1 may be the mobile device of a person different from that of the device control apparatus 1310 among the people based on the region 1340. The region 1340 may be a space-based region accessible by the device control apparatus 1310 through the local area network 1320.

An information provider 1350 of FIG. 13 may be defined in the same manner as the region 130 of FIG. 1. The local area network 1320 of FIG. 13 may be defined in the same manner as the local area network 140 of FIG. 1. Devices 2~m 1330_2 through 1330_m may correspond to the devices 1 to n 150_1 through 150_n of FIG. 1. The parts with the same reference numerals between FIGS. 13 and 1 may be interpreted to perform the same functions. The device control apparatus 1310 of FIG. 13 may access the information provider 1350 through the external network 120 and control at least one devices 1 to m 1330_1 through 1330_m accessible through the local area network 1320, like the device control apparatus 110 of FIG. 1.

The devices 2~m 1330_2 through 1330_m may include a mobile device. If the devices 2~m 1330_2 through 1330_m include at least one mobile device, the mobile device included in the devices 2~m 1330_2 through 1330_m may be the mobile device of a person different from the device 1 1330_1 among the people based on the region 1340. For example, if the region 1340 is a home-based region, the device control apparatus 1310 is one resident's mobile device, and the device 1 1330_1 is another resident's mobile device, the mobile device included in the devices 2~m 1330_2 through 1330_m may be a yet another resident's mobile device.

The invention can also be embodied as computer readable codes on a non-transitory computer readable recording medium. The computer readable recording medium is any data storage device that can store data which can thereafter be read by a computer system. Examples of the computer readable recording medium include Read-Only Memory (ROM), Random-Access Memory (RAM), CD-ROMs, magnetic tapes, floppy disks, optical data storage devices, and the like. The computer readable recording medium can also be distributed over network coupled computer systems so that the computer readable code is stored and executed in a distributed fashion. Also, functional programs, code, and code segments for accomplishing the present invention can be easily construed by programmers of ordinary skill in the art to which the present invention pertains.

While the present invention has been particularly shown and described with reference to certain embodiments thereof, it will be understood by one of ordinary skill in the art that various changes in form and details may be made therein without departing from the spirit and scope of the present invention as defined by the following claims and their equivalents.

What is claimed is:
1. A computer-implemented method of a device control apparatus for controlling at least one device placed in a local area network, the computer-implemented method comprising:
receiving outdoor environment information related to an area external to the local area network, from at least one network interface of a service provider;
analyzing content of the received outdoor environment information to detect, from a plurality of consecutive words included in a user's input signal, a keyword corresponding to the outdoor environment information;
selecting the at least one device from a plurality of devices placed in the local area network, based on the detected keyword and a database linking each of the plurality of devices to each of a plurality of keywords of the outdoor environment information;
generating, based on user information regarding user s schedule, control information regarding the selected at least one device;
based on the control information, generating guide information;

selecting, based on the user information regarding the user's schedule, a user device located external to the local area network to transmit the guide information;

transmitting the guide information to the selected user device; and transmitting, in response to receiving information for controlling the at least one selected device generated based on the guide information, the control information to the selected at least one device, wherein the database includes a table that has a plurality of rows comprising a header row that represents the plurality of keywords of outdoor environment information, and has a plurality of columns comprising a header column that represents the plurality of devices, and wherein each of the plurality of devices in the header column is linked to each of the plurality of keywords of outdoor environment in the header row in a one-to-one correspondence, and wherein, when a second row among the plurality of rows corresponds to a first device among the plurality of devices, a plurality of fields in the second row that correspond to the plurality of keywords in the one-to-one correspondence comprise information indicating whether each of the plurality of keywords activates an operation of the first device.

2. The computer-implemented method of claim 1, further comprising:

controlling the selected at least one device by using information received based on the guide information.

3. The computer-implemented method of claim 1, further comprising:

collecting indoor environment information indicating environment information related to an inside area of the local area network, wherein the generating the control information includes generating the control information based on the outdoor environment information and the indoor environment information.

4. The computer-implemented method of claim 3, further comprising:

collecting the user information, wherein the generating the control information includes generating the control information based on the outdoor environment information, the indoor environment information, and the user information.

5. The computer-implemented method of claim 4, wherein collecting the user information comprises:

searching for at least one of an external database of the device control apparatus for controlling the selected at least one device and an internal database of the device control apparatus.

6. The computer-implemented method of claim 4, wherein the user information comprises:

information indicating whether at least one user exists in a region for controlling the selected at least one device.

7. The computer-implemented method of claim 1, further comprising:

collecting the user information, wherein the generating the control information includes generating the control information based on the outdoor environment information and the user information.

8. The computer-implemented method of claim 7, wherein collecting the user information comprises:

searching for at least one of an external database of the device control apparatus for controlling the selected at least one device and an internal database of the device control apparatus.

9. The computer-implemented method of claim 7, wherein the user information comprises:

information indicating whether at least one user exists in a region for controlling the selected at least one device.

10. The computer-implemented method of claim 1, further comprising:

when the device control apparatus is determined to have left the local area network, transferring a control right of the device control apparatus to another device in the local area network.

11. The computer-implemented method of claim 10, wherein transferring the control right is performed based on information regarding previously set candidate devices.

12. The computer-implemented method of claim 1, wherein the user device is further selected based on at least one of location information and attribute information of the selected at least one device.

13. A computer-implemented method of a device control apparatus for controlling at least one device placed in a local area network, the computer-implemented method comprising:

obtaining at least one user information by searching for at least one of an external database of the device control apparatus for controlling the at least one device and an internal database of the device control apparatus;

selecting the at least one device from a plurality of devices placed in the local area network, based on the at least one user information, and the external database or the internal database linking each of the plurality of devices to each of a plurality of keywords of the outdoor environment information;

generating, based on the at least one user information regarding user's schedule, control information regarding the selected at least one device;

transmitting the control information to the selected at least one device;

based on the control information, generating guide information;

selecting, based on the at least one user information regarding the user's schedule, a user device located external to the local area network to transmit the guide information;

transmitting the guide information to the selected user device; and when the device control apparatus is determined to have left the local area network, transferring a control right of the device control apparatus to another device in the local area network, wherein the external database or the internal database includes a table that has a plurality of rows comprising a header row that represents the plurality of keywords of outdoor environment information, and has a plurality of columns comprising a header column that represents the plurality of devices, and wherein each of the plurality of devices in the header column is linked to each of the plurality of keywords of outdoor environment information in the header row in a one-to-one correspondence, and wherein, when a second row among the plurality of rows corresponds to a first device among the plurality of devices, a plurality of fields in the second row that corresponds to the plurality of keywords in the one-to-one correspondence comprise information indicating whether each of the plurality of keywords activates an operation of the first device.

14. The computer-implemented method of claim 13, wherein the at least one user information further comprises:
information indicating whether at least one user exists in a region for controlling the selected at least one device.

15. A non-transitory computer-readable recording medium having embodied thereon a program for executing a method of a device control apparatus for controlling at least one device placed in a local area network, the method comprising:
receiving outdoor environment information related to an area external to the local area network from at least one network interface of a service provider;
analyzing content of the received outdoor environment information to detect from a plurality of consecutive words included in a user's input signal, a keyword corresponding to the outdoor environment information, from among a plurality of keywords;
selecting the at least one de ice from a plurality of devices placed in the local area network, based on the detected keyword and a database linking each of the plurality of devices to each of a plurality of key words of the outdoor environment information;
generating, based user information regarding user's schedule, control information regarding the selected at least one device;
based on the control information, generating guide information;
selecting, based on the user information regarding the users schedule, a user device located external to the local area network to transmit the guide information generated based on the control information;
transmitting the guide information to the selected user device; and
transmitting, in response to receiving information for controlling the selected at least one device generated based on the guide information, the control information to the at least one selected device,
wherein the database includes a table that has a plurality of rows comprising a header row that represents the plurality of keywords of outdoor environment information, and has a plurality of columns comprising a header column that represents the plurality of devices, and
wherein each of the plurality of devices in the header column is linked to each of the plurality of keywords of outdoor environment information in the header row in a one-to-one correspondence, and
wherein, when a second row among the plurality of rows corresponds to a first device among the plurality of devices, a plurality of fields in the second row that corresponds to the plurality of keywords in the one-to-one correspondence comprise information indicating whether each of the plurality of keywords activates an operation of the first device.

16. The non-transitory computer-readable recording medium of claim 15, wherein the method further comprises:
when the device control apparatus is determined to have left the local area network, transferring a control right of the device control apparatus to another device in the local area network.

17. The non-transitory computer-readable recording medium of claim 15, wherein the user device is further selected based on at least one of location information and attribute information of the selected at least one device.

18. A non-transitory computer readable recording medium having embodied thereon a program for executing a method of a device control apparatus for controlling at least one device placed in a local area network, the method comprising:
obtaining at least one user information by searching for at least one of an external database of the device control apparatus and an internal database of the device control apparatus;
selecting the at least one device from a plurality of devices, based on the at least one user information, and the external database or the internal database linking each of the plurality of devices to each of a plurality of keywords of outdoor environment information;
generating, based on the at least one user information regarding user's schedule, control information regarding the selected at least one device;
based on the control information, generating guide information;
selecting, based on the at least one user information regarding the user's schedule, a user device located external to the local area network to transmit the guide information;
transmitting the guide information to the selected user device; and
transmitting, in response to receiving information for controlling the selected at least one device generated based on the guide information, the control information to the selected at least one device,
when the device control apparatus is determined to have left the local area network, transferring a control right of the device control apparatus to another device in the local area network,
wherein the external database or the internal database includes a table that has a plurality of rows comprising a header row that represents the plurality of keywords of outdoor environment information, and has a plurality of columns comprising a header column that represents the plurality of devices, and
wherein each of the plurality of devices in the header column is linked to each of the plurality of keywords of outdoor environment information in the header row in a one-to-one correspondence, and
wherein, when a second row among the plurality of rows corresponds to a first device among the plurality of devices, a plurality of fields in the second row that corresponds to the plurality of keywords in the one-to-one correspondence comprise information indicating whether each of the plurality of keywords activates an operation of the first device.

19. A device control apparatus comprising:
a first network interface configured to interface with an external network;
a second network interface configured to interface with a local area network; and
a processor configured to:
receive outdoor environment information related to an area external to the local area network, from at least one service provider via the first network interface,
analyze content of the received outdoor environment information to detect, from a plurality of consecutive words included in a user's input signal, a keyword corresponding to the outdoor environment information;
select at least one device from a plurality devices placed the local area network through the second network interface based on the detected keyword, and a database linking the plurality of devices to each of a plurality of keywords of the outdoor environment information;

generate, based on user information regarding user's schedule, control information regarding the selected at least one device;

based on the control information, generate guide information;

select, based on the user information regarding the user's schedule, a user device located external to the local area network to transmit the guide information;

transmit the guide information to the selected user device, through the second network interface; and transmit, in response to receiving information for controlling the selected at least one device generated based on the guide information, the control information to the selected at least one device, wherein the database includes a table that has a plurality of rows comprising a header row that represents the plurality of keywords of outdoor environment information, and has a plurality of columns comprising a header column that represents the plurality of devices, and wherein each of the plurality of devices in the header column is linked to each of the plurality of keywords of outdoor environment information in the header row in a one-to-one correspondence, and wherein, when a second row among the plurality of rows corresponds to a first device among the plurality of devices, a plurality of fields in the second row that corresponds to the plurality of keywords in the one-to-one correspondence comprise information indicating whether each of the plurality of keywords activates an operation of the first device.

20. The device control apparatus of claim 19, wherein the processor is further configured to output a control signal regarding the selected at least one device through the second network interface by using information received based on the guide information.

21. The device control apparatus of claim 19, further comprising:
a plurality of indoor sensors configured to collect indoor environment information indicating environment information related to an inside area of the local area network,
wherein the processor is further configured to generate the control information based on the outdoor environment information and the indoor environment information.

22. The device control apparatus of claim 21, wherein the processor collects the user information, and generates the control information based on the outdoor environment information, the indoor environment information, and the user information.

23. The device control apparatus of claim 22, further comprising:
a storage configured to store the user information,
wherein the processor searches for at least one of an external database accessible through the first network interface and an internal database stored in the storage to collect the user information.

24. The device control apparatus of claim 22, wherein the user information comprises:
information indicating whether at least one user exists in a region for controlling the selected at least one device.

25. The device control apparatus of claim 19, further comprising:
a storage configured to store the user information,
wherein the processor searches for at least one of an external database accessible through the first network interface and an internal database stored in the storage to collect the user information.

26. The device control apparatus of claim 19, further comprising:
a storage configured to store information regarding candidate devices capable of transferring a control right,
wherein the processor transfers the control right based on information regarding the candidate devices stored in the storage.

27. The device control apparatus of claim 19, wherein, when the device control apparatus is determined to have left the local area network, the processor transfers a control right of the device control apparatus to another device in the local area network.

28. The device control apparatus of claim 19, wherein the user device is further selected based on at least one of location information and attribute information of the selected at least one device.

29. The device control apparatus of claim 19, wherein the local area network is a home-based network.

30. A device control apparatus comprising:
a first network interface configured to interface with an external network;
a second network interface configured to interface with a local area network;
a processor configured to:
obtain at least one user information by searching for at least one of an external database via the first network interface and an internal database of the device control apparatus,
select at least one device from a plurality of devices in the local area network, based on the at least one user information, and the external database or the internal database linking the plurality of devices to each of a plurality of keywords of outdoor environment information,
generate, based on the at least one user information regarding user's schedule, control information regarding the selected at least one device based on the at least one user information,
based on the control information, generate guide information;
select, based on the at least one user information regarding the user's schedule, a user device located external to the local area network to transmit the guide information,
transmit the guide information to the selected user device,
transmit, in response to receiving information for controlling the selected at least one device generated based on the guide information, the control information to the selected at least one device, and
when the device control apparatus is determined to have left the local area network, transmit a control right of the device control apparatus to another device in the local area network; and
a storage configured to store a database based on the at least one user information,
wherein the database stored in the storage corresponds to the internal database,
wherein the external database or the internal database includes a table that has a plurality of rows comprising a header row that represents the plurality of keywords of outdoor environment information, and has a plurality of columns comprising a header column that represents the plurality of devices, and wherein each of the plurality of devices in the header column is linked to each of the plurality of keywords of outdoor environment information in the header row in a one-to-one correspondence, and wherein, when a second row among the plurality of rows corresponds to a first device among the plurality of devices, a plurality of fields in the second row that corresponds to the plurality of keywords in the one-to-one correspondence comprise information indicating whether each of the plurality of keywords activates an operation of the first device.

* * * * *